United States Patent [19]

Morrone

[11] Patent Number: 4,714,157

[45] Date of Patent: Dec. 22, 1987

[54] MEDIA STORAGE APPARATUS

[76] Inventor: James V. Morrone, 25 Sea Foam Ave., Winthrop, Mass. 02152

[21] Appl. No.: 756,716

[22] Filed: Jul. 18, 1985

[51] Int. Cl.$^4$ .............................................. B65D 85/57
[52] U.S. Cl. .................... 206/309; 206/303; 206/387; 206/804; 206/815; 220/335; 312/15
[58] Field of Search .......................... 206/307, 309–313, 206/387, 425, 444, 445, 45.24, 232, 45.13, 303, 804, 815; 220/331, 335, 85 CH, 85 R; 312/12, 13, 15, 17; 294/16, 27.1, 33, 99.2; 369/72, 290–292

[56] References Cited

U.S. PATENT DOCUMENTS

| | | | |
|---|---|---|---|
| 1,250,500 | 12/1917 | Pipp | 294/99.2 |
| 1,261,688 | 4/1918 | Bratherton | 369/72 |
| 1,276,326 | 8/1918 | Casper | 206/815 |
| 2,310,641 | 2/1943 | Lux | 206/45.24 |
| 2,977,127 | 3/1961 | Mertes | 369/72 |
| 3,209,903 | 10/1965 | Shiffman | 206/45.13 |
| 3,219,375 | 11/1965 | Van Pelt | 294/16 |
| 3,282,589 | 11/1966 | Morrison | 369/291 |
| 3,360,116 | 12/1967 | Somers et al. | 206/45.13 |
| 3,949,872 | 4/1976 | Paudras | 206/310 |
| 3,951,264 | 4/1976 | Heidecker | 206/444 |
| 4,079,979 | 3/1978 | Schweizer | 294/33 |
| 4,084,824 | 4/1978 | Kalivas | 369/292 |
| 4,176,744 | 12/1979 | Borzak | 206/310 |
| 4,208,117 | 6/1980 | Harvey et al. | 206/444 |
| 4,282,983 | 8/1981 | Swartzbaugh | 220/335 |
| 4,356,918 | 11/1982 | Kahle et al. | 206/444 |
| 4,369,879 | 1/1983 | Egly et al. | 206/444 |
| 4,379,507 | 4/1983 | Llabres | 206/309 |
| 4,401,216 | 8/1983 | Koch | 206/387 |
| 4,420,079 | 12/1983 | Gliniorz et al. | 220/331 |
| 4,479,577 | 10/1984 | Eichner et al. | 206/444 |
| 4,653,038 | 3/1987 | Boudreaux | 369/292 |
| 4,662,667 | 5/1987 | Gilligan et al. | 294/27.1 |

FOREIGN PATENT DOCUMENTS

| | | | |
|---|---|---|---|
| 0077019 | 4/1983 | European Pat. Off. | 206/387 |
| 0361637 | 10/1922 | Fed. Rep. of Germany | 206/265 |
| 2100464 | 7/1972 | Fed. Rep. of Germany | 206/387 |
| 1463331 | 12/1966 | France | 206/309 |
| 2533347 | 3/1984 | France | 206/387 |

*Primary Examiner*—Jimmy G. Foster
*Attorney, Agent, or Firm*—Wolf, Greenfield & Sacks

[57] ABSTRACT

Media storage apparatus including a housing with a plurality of tilted shelves, each of which is pivotal for providing access to a shelf thereunder. At the rear of the apparatus housing, there is a receiving shelf which is adapted, upon placement of the media thereon, to move in a downward horizontal direction until the predetermined desired shelf is reached at which time the receiving shelf tilts and transfers the storage media to the selected one of the plurality of shelves at the front of the housing. Thereafter, the receiving shelf under counter weight control resumes its initial position. Also disclosed herein are a number of embodiments of pick-up means for the disk along with different embodiments of the storage cases and associated inserts for the storage disk.

16 Claims, 33 Drawing Figures

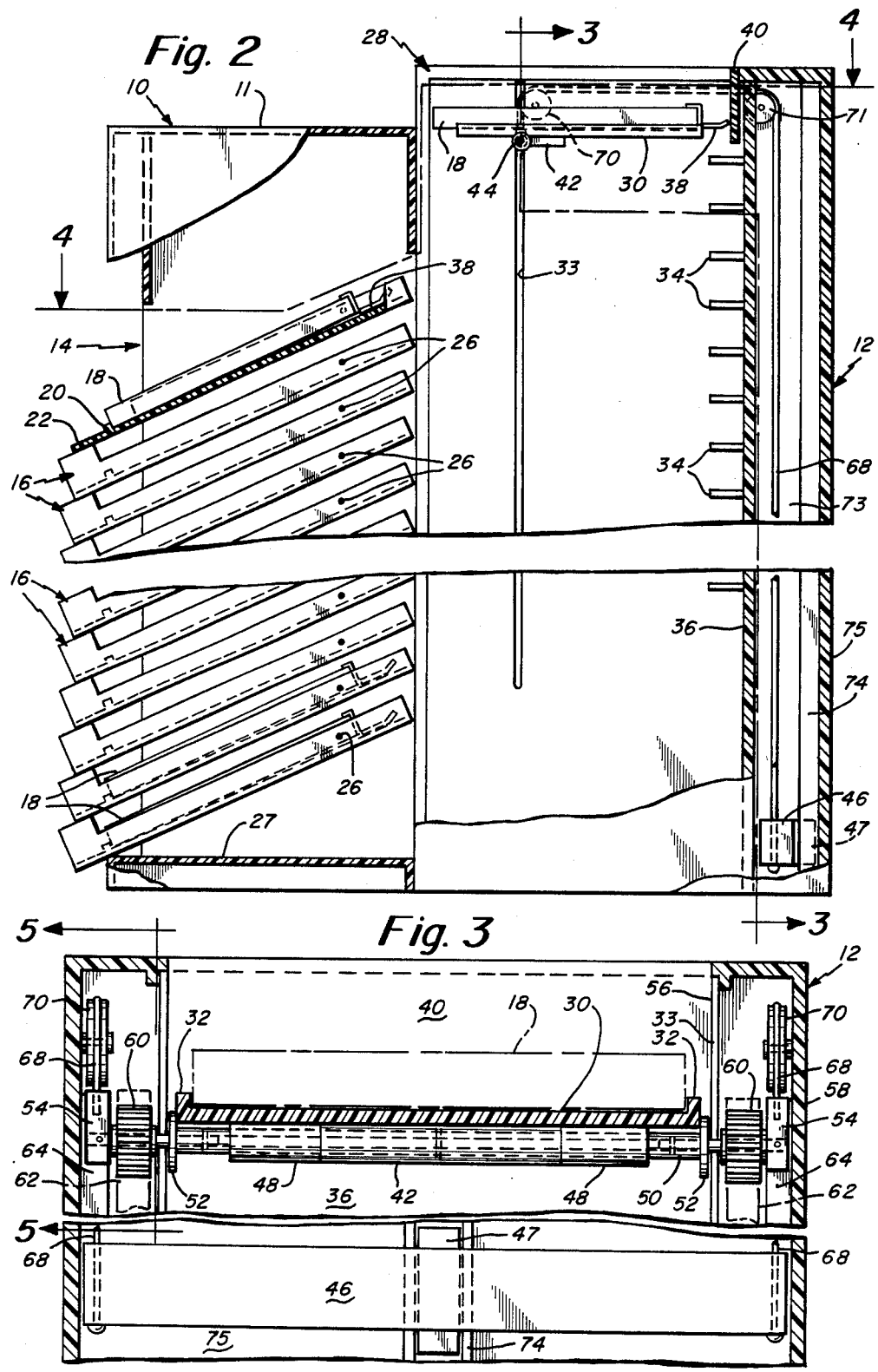

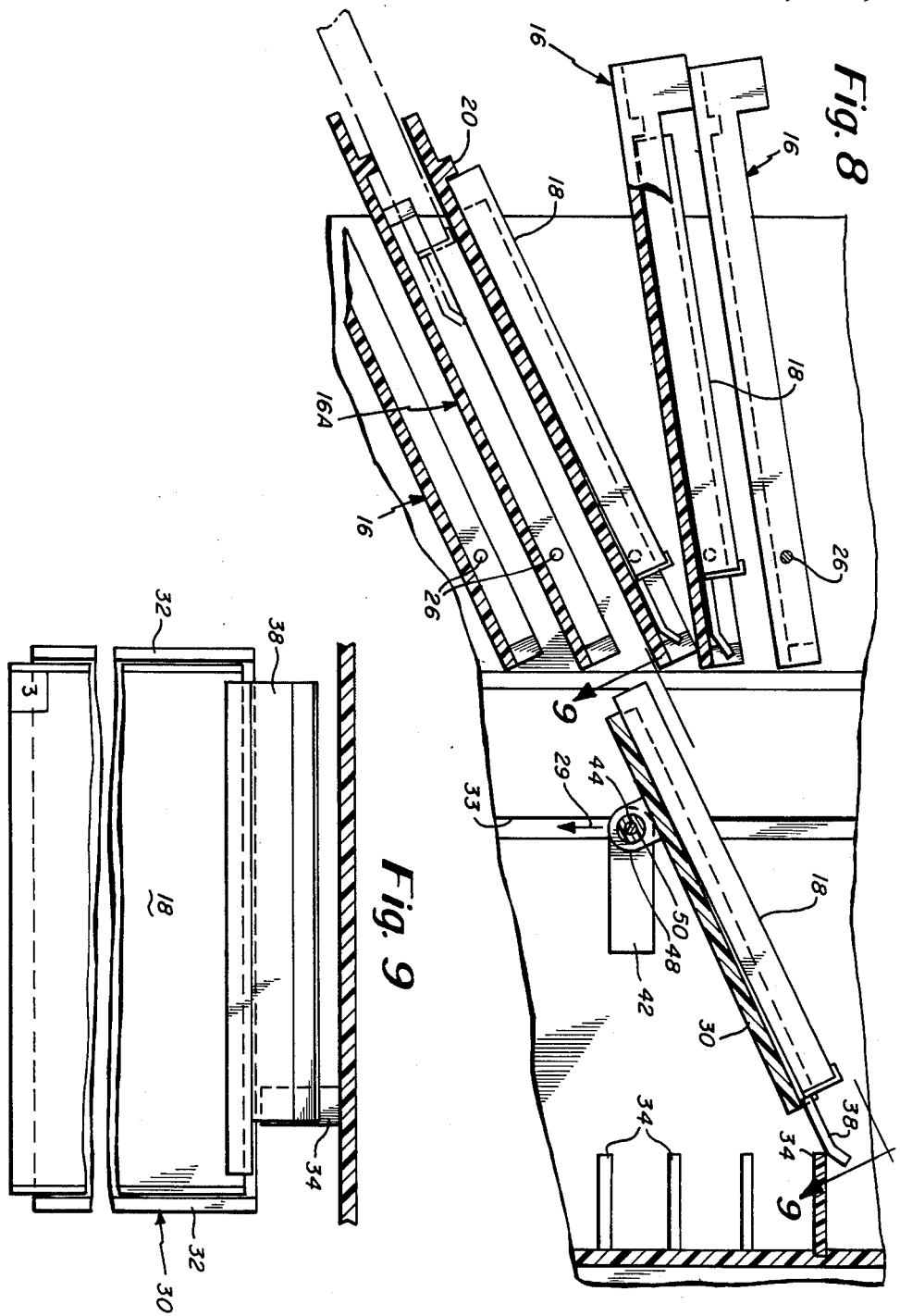

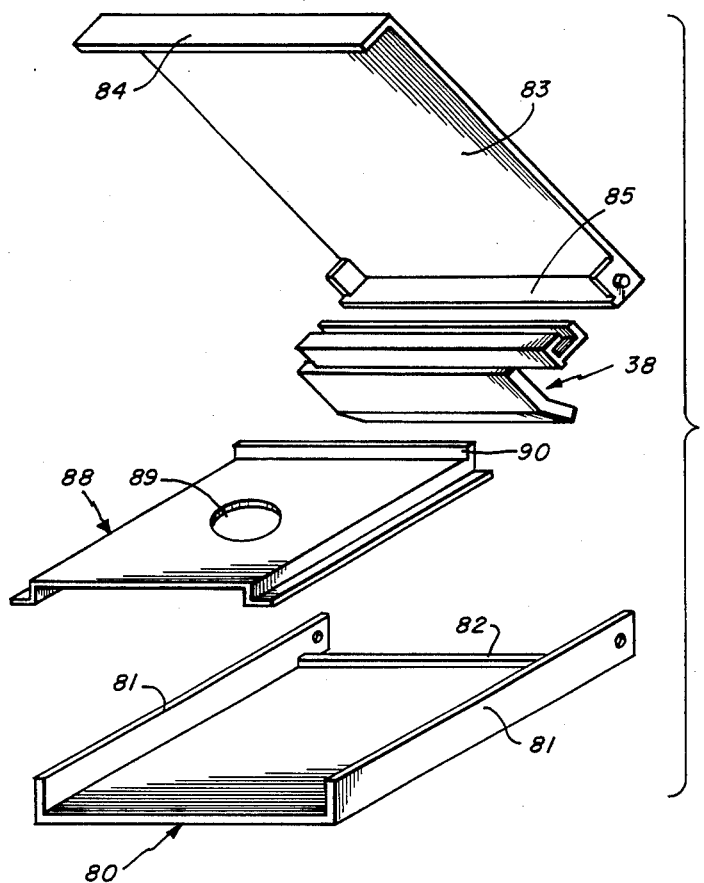
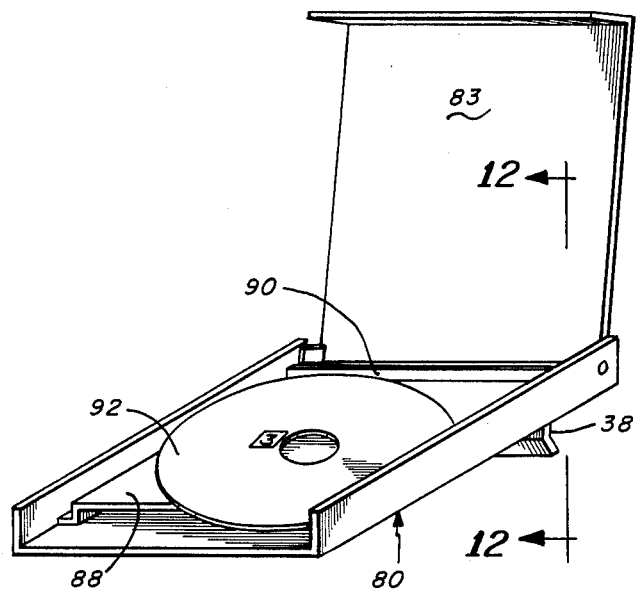
Fig.10
Fig.11

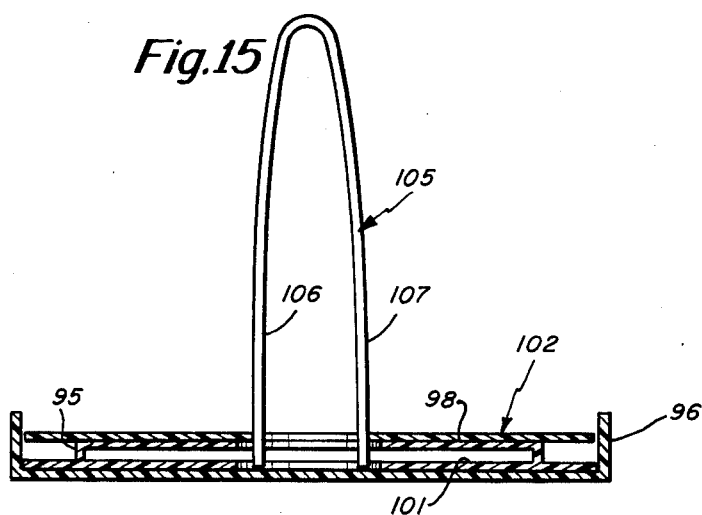
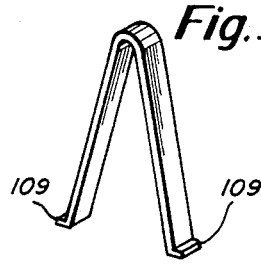
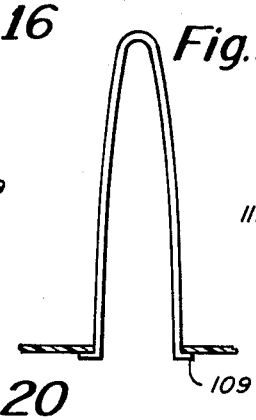
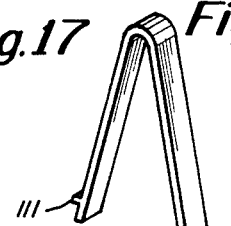
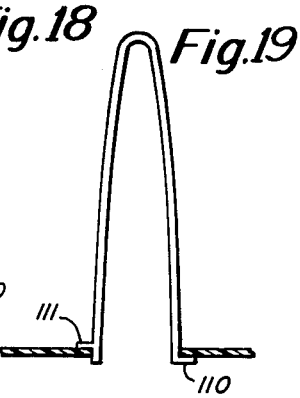
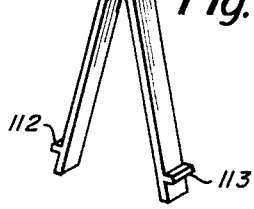
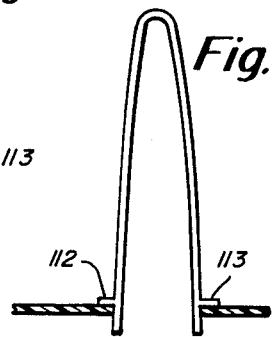
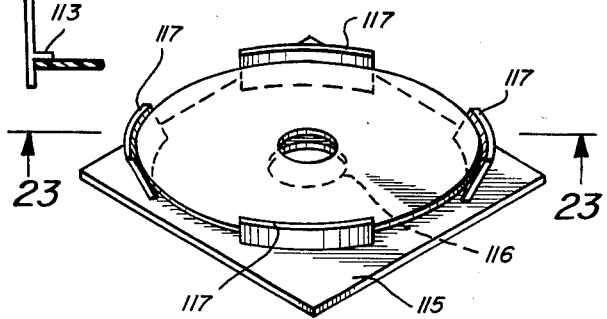

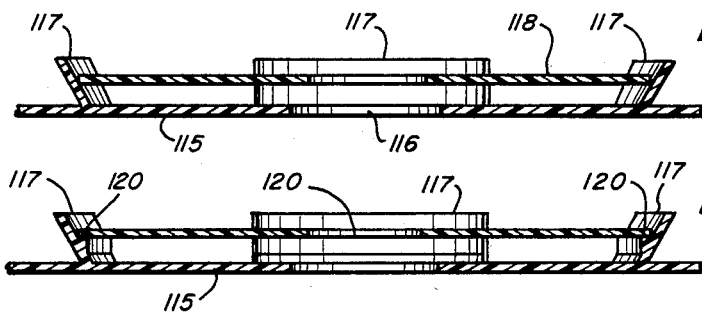
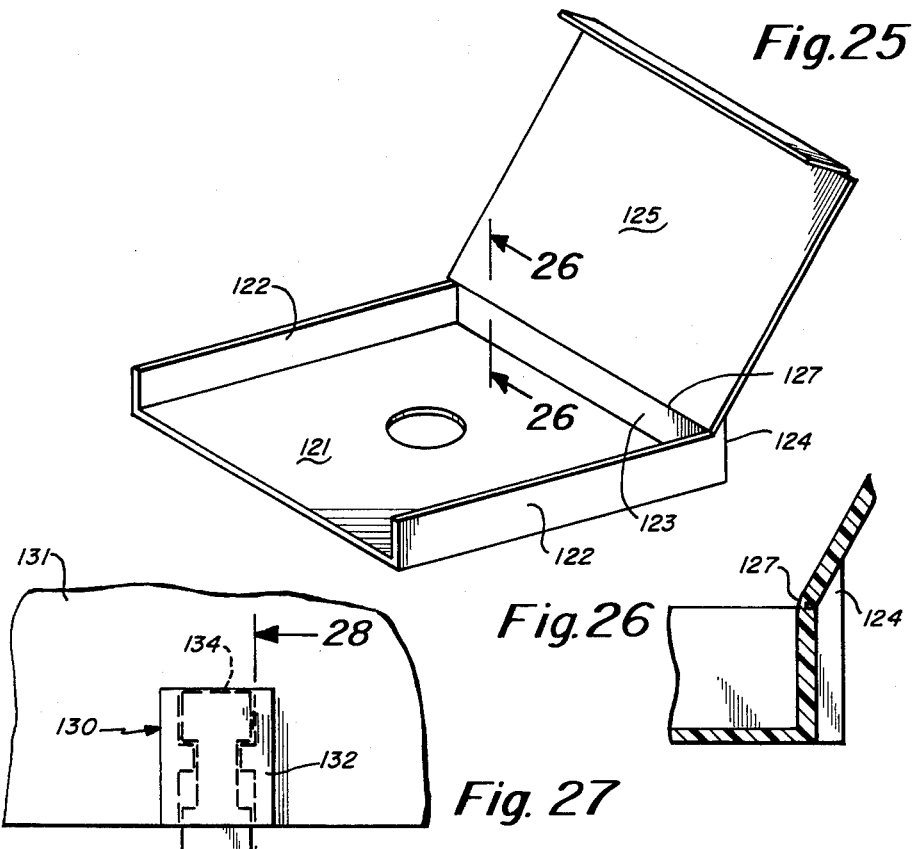
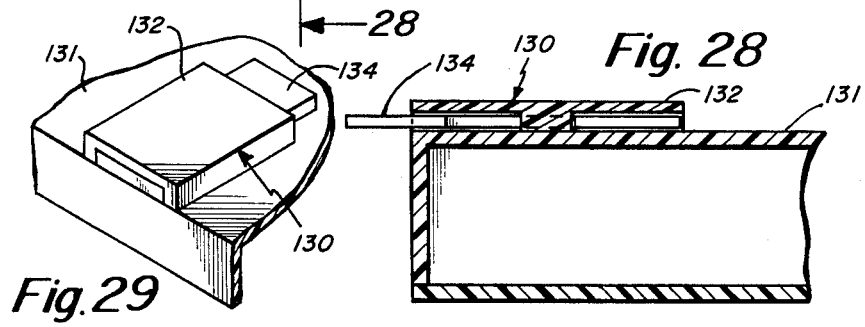

MEDIA STORAGE APPARATUS

BACKGROUND OF THE INVENTION

The present invention relates in general to a storage apparatus for media. In the preferred embodiment disclosed herein, the apparatus is for the storage of disks that are disposed in a case. However, it is understood that the principles of the present invention described herein may also be employed in the storage of cassettes, records, sheet music and the like.

In connection with the prior art, reference is made to my prior U.S. Pat. No. 4,082,385 which describes a record album filing cabinet having a staggered tab feature which enables each record in its album jacket to be returned to an original predetermined position on a particular shelf in the cabinet. Reference is also made to my U.S. Pat. No. 4,236,786 which relates to an improved record album filing cabinet in which each of the shelves has associated therewith, a notch which permits the user to insert the thumb or finger to withdraw the record album. This patent also describes the feature of having each shelf slidable so that the shelf may be withdrawn at least partially to expose the record should the record be stored without a jacket. In both of the above-referenced patents, the insertion and withdrawal of the media is carried out manually.

Accordingly, it is an object of the present invention to provide an improved media storage apparatus in which the storage disk or other media is essentially automatically stored at a predetermined position on a particular storage shelf of the apparatus.

Another object of the present invention is to provide an improved media storage apparatus having a front section comprising tilted shelves for the storage of media and a rear section in the form of a vertically movable shelf upon which a storage disk may be placed and from which the storage disk may be transferred to one of the front shelves.

Still a further object of the present invention is to provide an improved storage case for the media.

A further object of the present invention is to provide an improved media storage apparatus which in a manual embodiment thereof provides improved access to the media.

SUMMARY OF THE INVENTION

To accomplish the foregoing and other objects, features and advantages of the invention, there is provided an immediate storage apparatus that may be used for the storage of audio or video disks. The storage apparatus of the invention may in addition be used for the storage of other media products such as record albums or even sheet music. In connection with the embodiment of the invention specifically disclosed herein, the media is in the form of a disk that is stored within a storage case. The apparatus of the invention comprises a housing having disposed therein, a plurality of shelves which are supported in the housing in a substantially parallel array. These shelves are preferably individually pivotal and area supported in a position slightly tilted out of the horizontal. The shelves are preferably tilted approximately 25°-35° to the horizontal. There is also provided a receiving shelf which functions in the form of an elevator and which is supported at the rear part of the housing adjacent the plurality of storage shelves. Means are provided responsive to placement of the storage case on the receiving shelf for causing the receiving shelf to move to a position where it registers with one of the plurality of shelves. At that point, the receiving shelf tilts and transfers the storage case from the receiving shelf to the particular shelf that has been selected. Once the transfer takes place, then the receiving shelf under counter weight control returns to its initial position in readiness for receipt of another storage case.

Thus, in accordance with the present invention, there is provided a receiving shelf or table that is capable of translation in a preferred horizontal direction until the desired position is reached at which time the table tilts and transfers the storage case to the permanent shelf storage. The point at which the transfer takes place is determined by a selection clip that is attached to the storage case that engages with one of a series of spacedly and staggered tabs on a rear wall of the housing. When the particular width clip corresponds to the predetermined tab, then the tab lifts the clip and in turn pivots the receiving shelf so as to transfer the storage case to the predetermined storage shelf at the front of the apparatus.

In accordance with the invention, in this automatic apparatus, there is also provided means for pivoting each of the plurality of shelves so that access can be provided to a shelf thereunder for insertion of the storage case in a manual mode of operation. In this instance, each of the front of the shelves also has tab and cut-out means that correspond with the width of the clip so that the proper shelf can be selected by simple alignment of the clip on the storage case on one of the shelves. This alignment occurs by passing the storage case in a horizontal sweeping action until the tab on the shelf is engaged by the clip. It is also preferred that the side of the housing adjacent to the notch in the shelf be sectioned away so as to provide ready access at the side of the cabinet for providing ready access to the storage case.

Moreover, in accordance with the present invention, there is described herein an improved form of storage case having disposed therein a separate insert upon which the storage disk rests. In one embodiment herein, the insert has a hole therein corresponding in position to the hole in the disk and the insert is dimensioned so that the disk outer perimeter extends beyond the edge of the insert whereby an individual can easily grasp the disk with the thumb and fingers for removal of the disk from the storage compartment. In this embodiment, the storage compartment includes a top cover that is adapted to pivot and close the storage case.

In still another embodiment in accordance with the present invention, rather than providing for manual removal an insertion of the disk from its storage case, there is provided a simple pick-up device in the form of a spring-like forked member. When using the pick-up device, the insert may have front and back stop walls that prevent the disk from being slid out of the insert and out of the case. The disk is removed by opening the cover on the storage case and using the pick-up device. The pick-up device is compressed so as to fit within the hole in the disk and then is used to remove the disk from the storage case. In this connection, there are disclosed herein a number of different versions of the pick-up device, some including flanged ends and ribs for providing proper engagement between the pick-up device and the disk. There is also an embodiment of the invention in which the insert is in the form of a relatively flat plate member having upstanding slanted tabs, preferably four thereof, between which the disk may sit. These tabs may have a flat ledge associated therewith for positioning the disk. Also, with regard to the top cover of the storage case, there is preferably provided a thumb-lift mechanism which can be operated so as to make it easier to open up the cover of the storage case.

In accordance with the present invention, the storage apparatus may also be in the form of a cabinet that is operated manually in which the storage cases are inserted and withdrawn manually. In this instance, the shelves upon which the storage cases are disposed are arranged substantially horizontally and have at one side thereof, a notch which provides access to the storage case. Adjacent to the notch, the side wall of the cabinet is removed so as to provide, not only front, but also side access at the notch to each of the storage cases that are disposed on respective shelves. In this embodiment of the invention, there is also provided an angle bracket at the rear of the storage cabinet which can assume one of two different positions providing two different depths of penetration of the storage case into the cabinet. In the instance in which there is a clip on the storage case, then the angle bracket is disposed at its most rearward position and when there is no clip on the case, then it is disposed at its more forward position. In either position, the storage case is maintained at the same frontal position within the storage cabinet.

BRIEF DESCRIPTION OF THE DRAWINGS

Numerous other object, features and advantages of the invention should now become apparent upon a reading of the following detailed description taken in conjunction with the accompanying drawings, in which:

FIG. 2 is a side elevation cross-sectional view of the media storage apparatus of FIG. 1 illustrating the forward disposed tilted storage shelves and the rear for elevator section for illustrating the manner in which media cases may be reinserted into the apparatus;

FIG. 3 is a cross-sectional view taken along line 3—3 of FIG. 2;

FIG. 8 is a partial cross-sectional view similar to the view of FIG. 2 and further illustrating the manner in which a storage case is transferred from the rear portion of the apparatus onto the predetermined front tilted shelf;

FIG. 9 is a cross-sectional view taken along line 9—9 of FIG. 8 illustrating the interaction between the clip on the case and the selection tab which determines the particular front tilted shelf that the case is to be transferred to;

FIG. 10 is an exploded perspective view showing the preferred storage case and insert construction in accordance with the invention;

FIG. 11 is a perspective view showing the insert disposed in the case and with the storage disk disposed on the top of the insert;

FIG. 15 is a cross-sectional view taken along line 15—15 of FIG. 14 and also illustrating the pick-up device in place in the media disk;

FIGS. 16-21 illustrate different embodiments for the pick-up device used in accordance with the invention;

FIG. 22 illustrates an alternate form of insert used in the storage case;

FIG. 23 is a cross-sectional view taken along line 23—23 of FIG. 22.

FIG. 24 is a cross-sectional view similar to the view of FIG. 23 but for an alternate embodiment of the insert;

FIG. 25 is a perspective view of an alternate case in construction;

FIG. 26 is a fragmentary cross-sectional view taken along line 26—26 of FIG. 25 illustrating further detail of the case;

FIG. 27 is a fragmentary plan view showing a lift mechanism that may be used with any of the cases described herein;

FIG. 28 is a cross-sectional view taken along line 28—28 of FIG. 27;

FIG. 29 is a fragmentary perspective view illustrating the lift mechanism of FIGS. 27 and 28;

DETAILED DESCRIPTION

Figure 1:
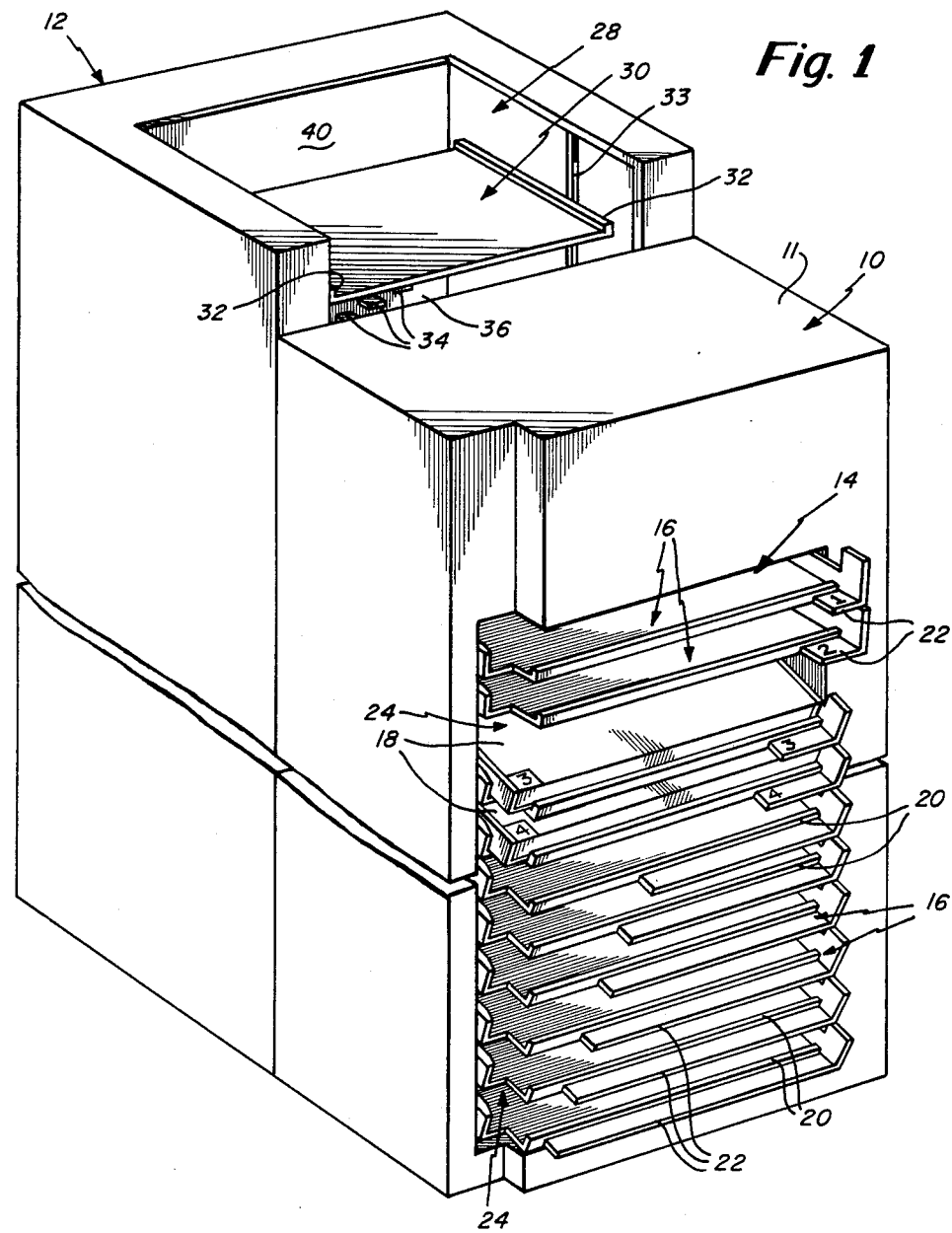
FIG. 1 is a perspective view of a preferred embodiment of the automatic media storage apparatus of the present invention, particularly directed to the storage of disks which are individually retained in separate disk storage cases.

Reference is now made to FIGS. 1-9 of the drawings in which there is illustrated a preferred embodiment of the automatic media storage apparatus of the present invention. The automatic aspect of the present invention relates to the fact that a media storage case may be inserted into the apparatus location and is then automatically transferred to a predetermined location in the apparatus.

The apparatus described in FIGS. 1-9 may be considered as separated into front and rear sections. The front section contains the shelves upon which the storage cases are stored. The rear section is used to carry out the transfer of an initial depositing position of each storage case into the individual shelves. There is thus provided a front housing 10 and a rear housing 12. Each of the housings 10 and 12 may be constructed of a plastic material, a wood material, or a metal material. The housing 10 has an open front 14 and is adapted to accommodate a plurality of storage case shelves 16. Each of these shelves 16 has a base and side disposed walls so as to securely retain a media storage case such as the cases 18 illustrated in FIG. 1. At the front edge of each shelf there is also provided a stop wall 20. The cases 18 which are numbered #3 and #4 are both illustrated as being retained in position by this stop wall 20. Each of the shelves also has associated therewith a tab 22 and at the opposite side of each shelf a cut-out 24. The tabs 22 are each of a different length and are adapted to be used in the manner illustrated in my prior U.S. Pat. Nos. 4,082,385 and 4,236,768. This enables one to manually load the storage case in a manner to be described hereinafter.

Figure 4:
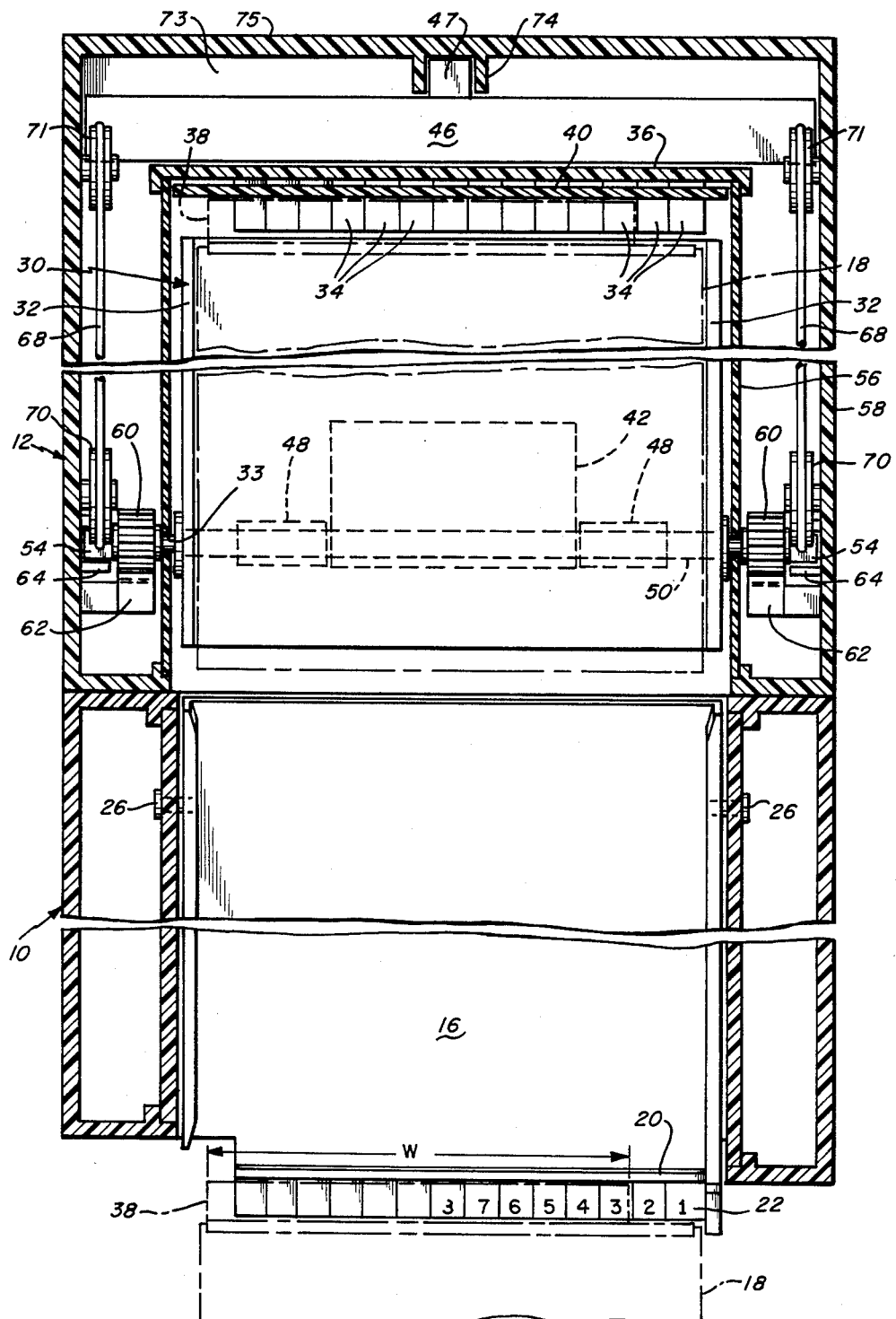
FIG. 4 is a cross-sectional view taken along line 4—4 of FIG. 2.
Figure 5:
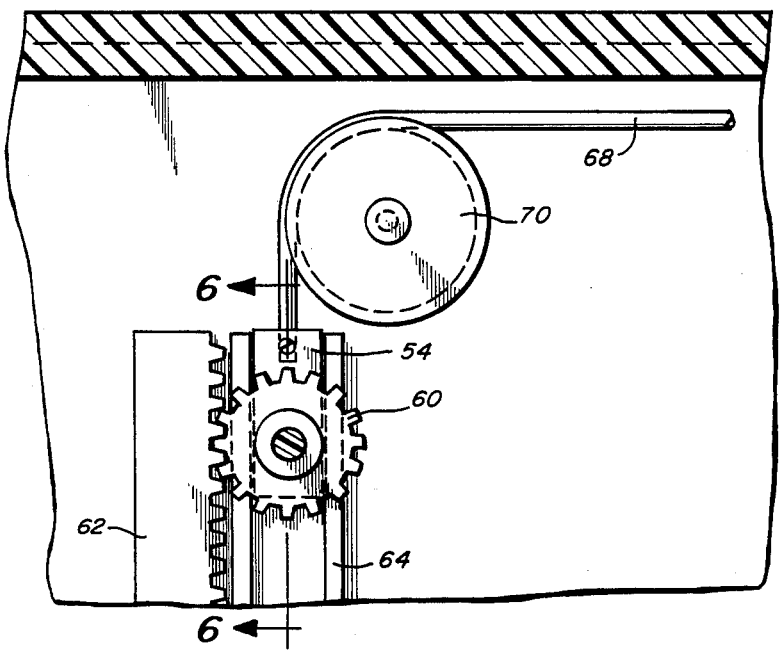
FIG. 5 is a cross-sectional view taken along line 5—5 of FIG. 3 illustrating the rack and pinion arrangement for enabling the dropping shelf to move in a horizontal direction.

It is furthermore noted that each of the shelves 16 is supported in a pivotal manner by means of the pivot rod 26 such as illustrated in FIGS. 2, 4, and 8. It is also noted in FIG. 1 that the second shelf identified by #2 on the tab 22 has been lifted so as to provide access to the shelf therebelow where the case #3 has been inserted into the shelf. Thus, any one of the shelves is readily pivoted upwardly as to provide access to a shelf therebelow. In the case where the second shelf is pivoted upwardly, it is noted that the shelf thereabove is also pivoted therewith. Thus, any shelf that is selected for slight pivoting upwardly will automatically pivot all of the shelves thereabove. In this connection, the shelves in the normal rest position are essentially stacked one on top of the other at the front edge thereof as clearly illustrated, for example, in FIG. 2. It is also noted in FIG. 2 that the very bottom-most shelf rests upon the base wall 27.

Now, with regard to the rear housing 12 as illustrated in FIG. 1, this housing extends slightly above the top of the housing 10 and is provided with an opening 28 at the top thereof which provides access to the receiving shelf 30. It is noted that the shelf 30 is, for the most part, in horizontal alignment with the top wall 11 of the front housing 10. It is also noted that the receiving shelf 30 preferably has side ribs 32 for retaining the storage case in place. In FIG. 1 the storage case is not shown in position on the receiving shelf. However, in FIGS. 2 and 3 it is noted that the storage case 18 is shown disposed on the shelf 30. It is further noted in FIG. 1 that there are illustrated some of the tabs 34 that are used in determining the location at which the storage case is transferred from the receiving shelf 30 to one of the front disposed substantially fixed position shelves 16. It is noted that these tabs 34 are arranged in a staggered arangement extending at different predetermined horizontally disposed positions and staggered from the upper right hand corner to the lower left hand corner as viewed in FIG. 1. These tabs 34 as also illustrated in, for example, FIG. 2 are supported from the back wall 36.

FIG. 2 illustrates the case 18 disposed on the receiving shelf 30. FIG. 2 also illustrates the selection clip 38 that is attached to the case 18. In the position illustrated in FIG. 2, the selection clip 38 abuts against the stopping board 40. In this connection, also note FIG. 4 which shows the case 18 disposed on the receiving shelf 30 and furthermore illustrating the clip 38 as abutting against the stopping board 40. Hereinafter reference will be made to the interaction between the clip 38 and the tabs 34 as the receiving shelf 30 moves downwardly.

Figure 6:
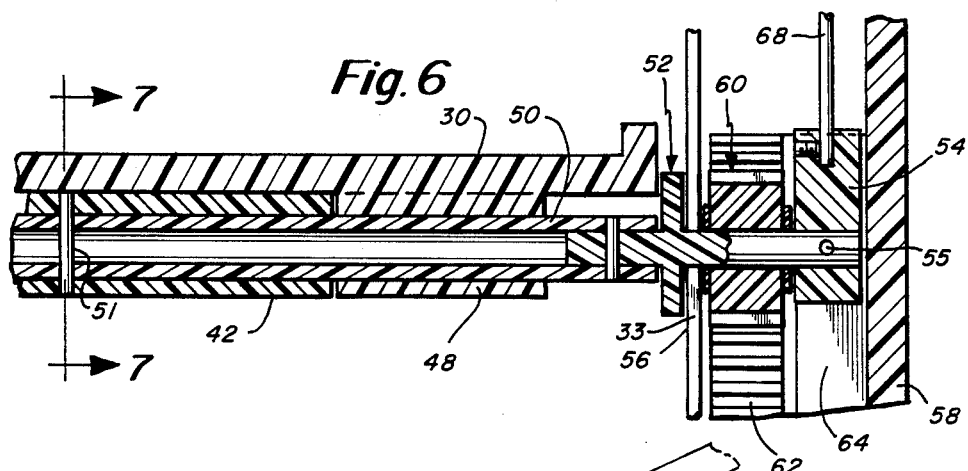
FIG. 6 is a cross-sectional view taken along line 6—6 of FIG. 5 showing further detail of the dropping shelf structure.
Figure 7:
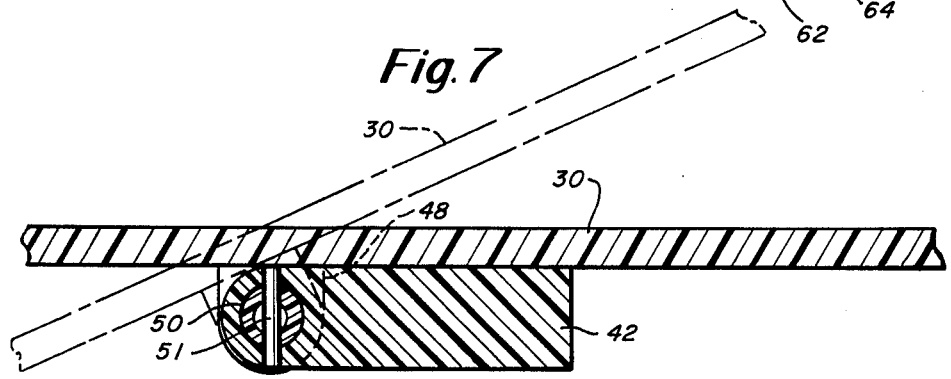
FIG. 7 is a cross-sectional view taken along line 7—7 of FIG. 6 and further illustrating in phantom the pivoting of the dropping shelf.

The receiving shelf 30 is adapted to be maintained in a substantially horizontal position such as illustrated in FIGS. 2 and 7. It is retained in this position primarily by means of the stop 42. The stop 42 actually forms part of the pivot mechanism and in this regard, reference may also be made to FIGS. 3-6. Although the receiving shelf 30 is adapted for normal horizontal positioning, it is adapted also to be tilted about the pivot point 44 illustrated in FIG. 2.

In addition to the pivoting operation of the receiving shelf 30, it is also adapted to move horizontally from the position illustrated in FIG. 2 at the top of the housing 12 to a lower position. This occurs under gravity control. Once the case 18 is loaded onto the receiving shelf 30 as illustrated in FIG. 2, then the weight of the case with its enclosed insert and disk, overcomes the weight of the counterweight 46. When this occurs, the shelf 30 is permitted to move downwardly and when the clip 38 contacts its appropriate tab 34, then the shelf is tilted as illustrated and discussed in further detail hereinafter with regard to FIGS. 8 and 9.

As far as the pivoting of the shelf 30 is concerned, reference is made to the detail of FIG. 6 which shows, as an integral part of the shelf 30, the hinge 48 which is adapted to pivot about the pivot rod 50. It is noted that the stop 42 is secured to the pivot rod 50 by means of a pin 51 which assures that the stop 42 is maintained in position and does not pivot. Only the shelf 30 pivots at the hinge 48 relative to the hollow pivot rod 50. At either end of the pivot rod 50, there is provided a member 52 that is adapted to be secured in the cable blcok 54 by means of pin 55. A part of the member 52 is disposed inside of the wall 56 and a part is disposed between the wall 56 and the outer wall 58.

Also secured to the member 52 is the pinion gear 60 which is adapted to operate with the rack gear 62 in controlling the horizontal displacement of the receiving shelf 30. In this connection, reference is also made to FIG. 5 which shows the guide member 64 which receives the cable block 54 and which assists in guiding the receiving shelf mechanism in a proper horizontal direction.

Thus, the receiving shelf 30 is adapted for horizontal movement under control of the rack and pinion arrangement and with the shelf being guided for the most part by means of the interaction between the guide 64 and the cable block 54. There is also an amount of free wheeling that occurs between the pinion gear 60 and the rack gear 62 which dampens the return action when the counter weight 46 takes over after there has been a transfer of the case to one of the shelves 16.

Now, with regard to the horizontal movement of the shelf 30, this occurs as indicated previously, by gravity. In this regard, from the cable block 54 there is provided a cable 68 that is secured to the cable block 54 and extends about considerably supported pulleys 70 and 71. As illustrated by way of example in FIG. 3, there are, of course, a pair of each of these pulleys such as the pair of pulleys 70 illustrated in FIG. 3. There is of course provided support at each side of the shelf 30 including a cable block and rack and pinion gear arrangement on either side as also illustrated in FIG. 3. FIG. 4 also illustrates the pulleys 70 and 70 along with the cable 68 extends horizontally within the compartment 73 at the rear of the housing 12. The cable 68 is secured at the bottom of the compartment 73 to the counter weight 46. Reference is also made to FIG. 3 which shows the counter weight 46 and the oppositely disposed cables 68 which are secured thereto. As illustrated in FIGS. 3 and 4, part of the counterweight 46 includes a guide 47 that is adapted to ride within the channel 74 in the very rear wall 75 of the housing 12.

Reference is now made to the operation of the apparatus of the present invention, both in the manual mode of operation and in the automatic mode of operation. First, with regard to the manual mode of operation, reference may be made to FIG. 4 which shows the case 18 in phantom being manually inserted at one of the shelves 16. Now, the clip 38 that is associated with this particular case 18 has a width W so that when it is engaged with each of the shelves starting from the top, it will rest upon the third shelf as illustrated in FIG. 4 and thus slide only into this third shelf. If the clip 38 is wider, then it engages with the first or second shelf, and if the clip is narrower, it engages with one of the shelves therebelow. This form of engagement is generally of the same type as illustrated in my prior U.S. Pat. Nos. 4,082,385 and 4,236,786.

With further reference to the manual mode of operation, it is also noted in FIG. 9, that there is illustrated two of the top shelves 16 being swung upwardly so as to provide improved access to the shelf therebelow. This pivoting of the shelves above the one that is being accessed, enables both ready loading of the case onto the appropriate shelf and also enables ready removal of the case from its storage position on the shelf 16. The cutout 24, of course, also provides access for grasping the case upon removal thereof.

Now, with regard to the automatic mode of operation, initially, it is assumed that the receiving shelf 30 is empty as illustrated in FIG. 1. If one of the cases with its associated disk has been previously removed from a shelf and it is desired to again insert it back into the shelf, rather than the form of manual insertion as just discussed, one can simply insert the case with the clip 38 attached thereto onto the receiving shelf 30. This puts the apparatus in the position illustrated in FIG. 2. The counter weight is selected so that when the case is inserted onto the shelf, the weight of the case overcomes the weight of the counterweight and thus the counterweight moves upwardly at the same rate as the shelf 30 moves downwardly. The downward movement of the shelf is controlled by virtue of the ring and pinion arrangement and also the slot 33 which essentially captures the member 52 and thus guides the entire shelf mechanism. Guidance is also provided as mentioned previously by the guide 64.

Now, as the receiving shelf 30 moves downwardly at the appropriate position depending upon the width of the tap 38, one of the tabs 34 is engaged as illustrated in FIG. 8. When this occurs, the shelf 30 continues to move downwardly and thus the shelf automatically pivots to a tilted position such as illustrated in FIGS. 7 and 8. This tilting causes the case 18 to slide off of the receiving shelf 30 into its appropriate shelf 16 which in the view of FIG. 8 has been designed as shelf 16A. It is noted that the shelf 16A aligns precisely with the tilted position of the receiving shelf 30 so that the case 18 readily slides from the shelf 30 into the shelf 16A. The case 18 is prevented from falling from the shelf 16 by virtue of the stop wall 20 associated therewith.

It is also noted that FIG. 9 clearly illustrates the manner in which the clip 38 contacts the tab 34. The tilting of the receiving shelf 30 operates in a manner whereby any tabs above the tab noted in FIG. 9 are not engaged because they are outside of the width of the clip, any tabs under the tab 34 would be engaged, but the shelf does not go that far in that it will tilt and release the case upon engagement with the first tab 34 that it engages with.

Now, as soon as the case 18 is released into the front shelf 16, the counterweight 46 takes over and the previous downward travel of the shelf 30 as indicated by the arrow 29 in FIG. 8 ceases. The counterweight takes over and the shelf then progresses upwardly. The clip 38 then disengages from the tab 34 and again assumes its horizontal position against the stop 42. In this regard, the shelf 30 is structured so that most of the weight is to the right of the pivot point 44 and thus the shelf 30 is normally by gravity moved to a horizontal position.

Thus, a disk case that has the appropriate clip disposed thereon can be used for proper registration either in the manual mode at the front of the apparatus or the case can be loaded at the top of the rear of the apparatus and is automatically transferred to the appropriate storage shelf 16.

Of course, there is illustrated herein, a clip 38 of one width. Each of the shelves having associated therewith tabs of different width, thus have associated therewith also, cases of different width clip. The ones with the narrower width clip are adapted for insertion of the lower portion of the apparatus and these with a wider width clip are adapted for insertion at the upper part of the apparatus. This insertion as indicated can either be manual by virtue or registration at the front of the apparatus or can be automatic by virtue of engagement of the clip with the tabs 34.

Reference is now made to FIGS. 10-13 which illustrate one embodiment of the storage case that may be employed. FIG. 10 is an exploded perspective view while FIG. 11 is a perspective view showing the case in its assembled position. The case includes a bottom 80 having side walls 81 and a rear stop 82. There is also a cover 83 having a fixed front piece 84. The cover 83 also has a rear wall 85 to which the clip 38 is engaged. The bottom 80 preferably is provided with a hole 87.

In FIG. 11, the cover 83 is shown engaged with the base 80. Also, the insert 88 with its hole 89 is shown in position within the case. When the insert 88 is in place in the case the holes 87 and 89 preferably align. It is noted that the insert 88 also has a rear stop wall 90.

As illustrated in FIG. 11, the rear wall 90 limits the rearward position of the disk 92. However, the disk 92 preferably extends over the front edge of the insert 88. This enables one to use, say the thumb at the hole of the disk and one or more fingers at the edge of the disk that overhangs the insert. This thus enables one to readily remove the disk from its storage position.

Figure 12:
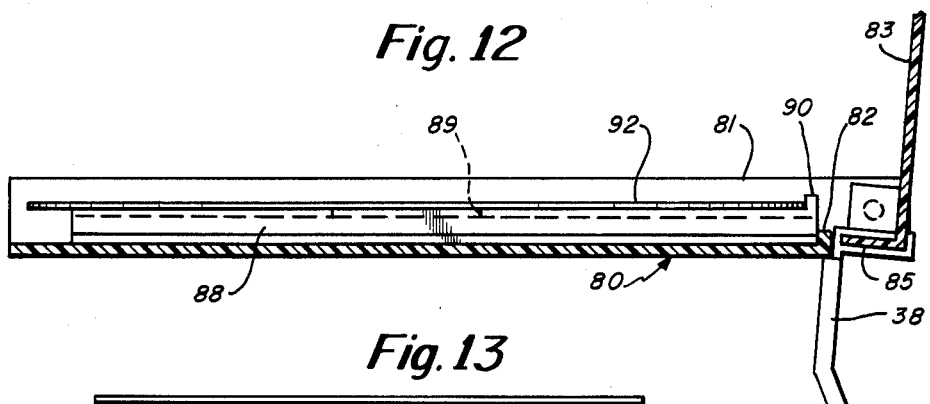
FIG. 12 is a cross-sectional view taken along line 12—12 of FIG. 11.
Figure 13:
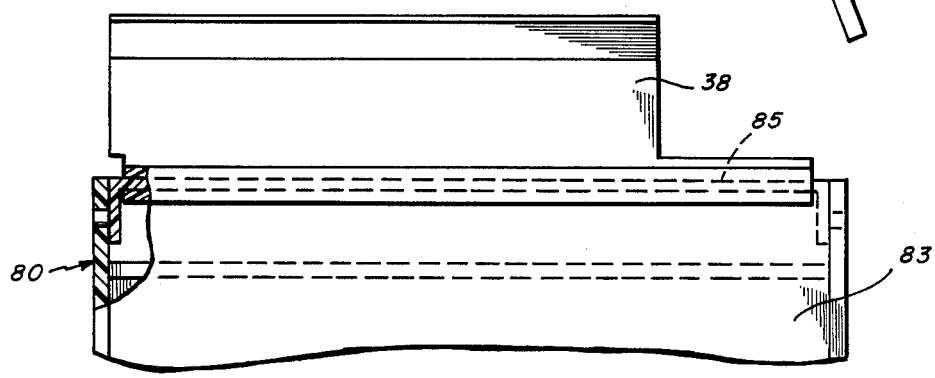
FIG. 13 is a fragmentary top plan view of the embodiment illustrated in FIGS. 10-12.

Also, it is noted that the front wall 84, when the case is closed, prevents the disk 92 from sliding out of the storage case. Also, as noted in FIG. 12, when the cover 83 is in its upright position as also illustrated in FIG. 11, the clip 38 engages with the underside of the base so as to maintain the cover in an open position slightly slanted backwardly as illustrated in FIG. 12. Again, when the cover 83 is rotated downwardly to a closed position, then the front wall 84 covers the disk and prevents the disk from disengaging from the case.

Figure 14:
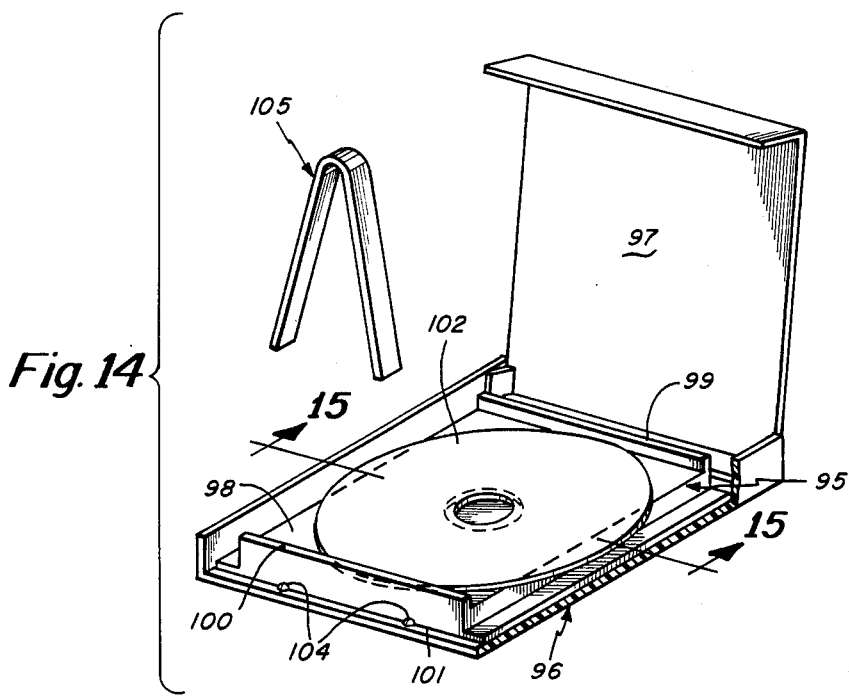
FIG. 14 is a perspective view of an alternate case construction in accordance with the invention also illustrating a pick-up device used in association therewith.

FIGS. 14 and 15 illustrate a further embodiment of the present invention and in particular illustrate a different version of the insert. In FIG. 14, the insert 95 is used within a case comprising a base 96 and a cover 97. The insert 95 includes a base wall 97 and a platform 98. At either end of the platform are stops 99 and 100. Because there are stops at either end, the disk 102 is limited from either forward or back movement. The disk 102 is also prevented from side movement by virtue of the side walls on the case.

In order to prevent the insert 95 from moving, the bottom wall of the case preferably has a series of protrusions 104 at the front edge which engage with the front of the bottom wall 97 when the insert is inserted all the way into the case.

Now, with reference to FIG. 15 it is noted that there is shown the pick-up device 105 which is made of a spring-like material and which is normally in a spread position as illustrated in FIG. 14. The pick-up device 105 has opposite legs 106 and 107. FIG. 15 shows the device being compressed so that the end of the device can be inserted into the hole in the disk. Preferably, as illustrated in FIG. 15, the insert itself in both the platform 98 and its lower wall 97 have holes for accommodating the very end of the pick-up device 105. Of course, so that there is not any difficulty in removing the disk, the holes in the insert are large diameter than the hole in the disk 102.

Thus, in the embodiment of FIGS. 14 and 15, rather than using ones fingers to remove the disk, the pick-up device is used which assures that no damage occurs to the disk itself. In this embodiment, the ribs 104 prevent the insert from being removed from the case and the stop walls 99 and 100 on the insert prevent the disk from being displaced.

FIGS. 16–21 now illustrate different versions of the pick-up device. In the version of FIG. 16, the pick-up device has flanged ends 109. FIG. 16 shows the pick-up device in its natural open position. FIG. 17 illustrates the pick-up device in its compressed position in the hole in the disk. The flanged end 109 as illustrated in FIG. 17 is disposed under the disk. This aids in maintaining the proper orientation between the disk and the pick-up device.

FIGS. 18 and 19 illustrate a further embodiment of the pick-up device including one flanged end 110 and a ridge 111. As illustrated in FIG. 19, the flanged end 110 is adapted to fit under the disk at the hole while the rib 111 is adapted to fit over the top surface of the disk.

Finally, FIGS. 20 and 21 illustrate still another embodiment in which there are a pair of ribs 112 and 113 on the pick-up device. These ribs as illustrated in FIG. 21 are disposed over the top of the disk and then the very ends of the legs of the pick-up device extend beneath the disk.

FIGS. 22 and 23 illustrate a further embodiment of an insert. This insert can be used for manual removal of a disk or a pick-up device can be used in association therewith. The insert in FIGS. 22 and 23 comprise a base 115 having a hole 116 therein and four angularly disposed tabs 117. The disk 118 is simply laid inside of the tabs 117 as illustrated in FIGS. 22 and 23.

FIG. 24 shows a similar insert with a base 115 and tabs 117. However, there is also added a flat edge 120 which is used to more exactly register the disk with the insert.

FIG. 25 shows an alternate embodiment for the disk case. In this embodiment, there is provided a base 121 with side walls 122 in a rear wall 123. The rear wall is configured as illustrated in the cross-sectional view of 26 with a tapered stop 124. FIG. 25 also shows the cover 125. As illustrated in FIG. 26, the cover 125 is hinged at 127 and the stop 124 prevents the cover from extending any further back than the position illustrated in FIGS. 25 and 26.

FIGS. 27–29 illustrate a lifting mechanism that may be employed with any one of the cases that are illustrated herein. The lifting mechanism 130 is used in conjunction with the cover 131. In this regard, there is provided a small housing 132 that is hollow and that is adapted to receive the slide piece 134. The slide piece 134 is I-shaped in a plan view as illustrated in FIG. 27 and is restricted in movement between a withdrawn position as illustrated in FIG. 29 and an extended position as illustrated in FIGS. 27 and 28.

When one wishes to lift the cover of the device, one simply pushes on the rear of the piece 134 in FIG. 29 so as to push the piece 134 out to the front as illustrated in FIG. 28. The piece 134 may then be grasped so as to easily open the cover of the storage case.

FIGS. 30–33 now illustrate a further embodiment of the present invention. The cabinet described therein comprises vertical side walls 212 and 214 and a top 216 which is secured by any suitable means to the top ends of the side walls 212 and 214 to assist in maintaining the side walls in a vertical and parallel position. A plurality of shelves 218 are also provided and are disposed in horizontally spaced relation with each other and coupled basically between the side walls 212 and 214. As in other embodiments described herein, the cabinet may be made from wood, plastic or metal or any other suitable material. Each of the shelves has defined at its front edge, a cut-out portion 220 and an extending substantially rectangular tab 222. As is apparent from FIG. 30, the cut-out portions in each shelf from the top shelf to the bottom shelf become progressively shorter in their lateral dimensions. This arrangement is substantially shown in U.S. Pat. No. 4,082,385.

Figure 30:
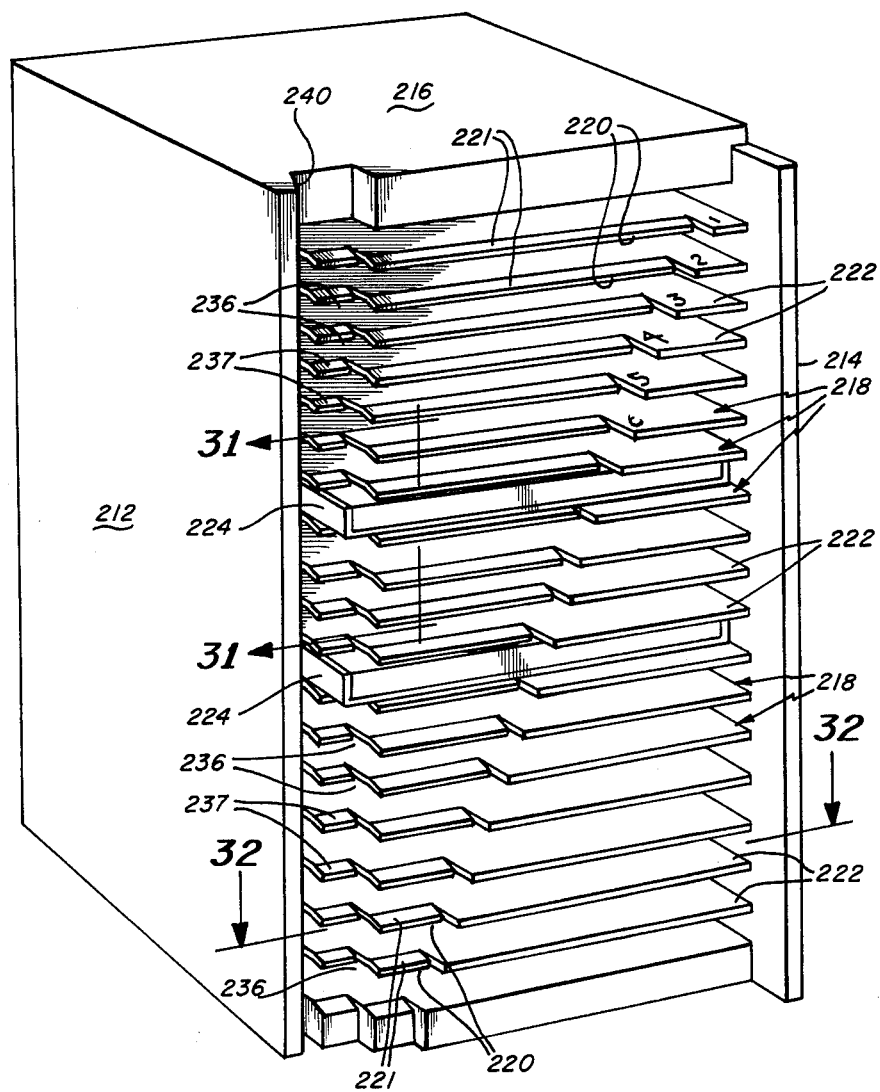
FIG. 30 is a perspective view of the further embodiment of the present invention in the form of an improved manual storage cabinet particularly adapted for the storage of disk media which are adapted for storage in a disk storage case.
Figure 31:
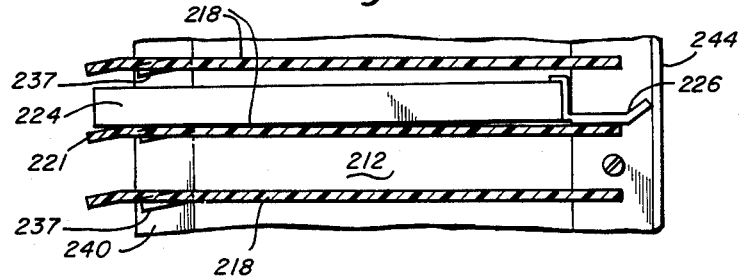
FIG. 31 is a cross-sectional view taken along line 31—31 of FIG. 30 showing further details, particularly at the rear of he cabinet.

The cabinet shown in FIG. 30 is primarily for the storage of storage cases containing disks but could also be used for the storage of record albums and many other items. In FIG. 31 there are illustrated a couple of storage cases 224.

FIG. 31 illustrated the clip 226 secured to one of the cases 224. As in previous embodiment, the clip 26 has a particular width which is adapted to permit its selection by only one of the shelves 218. In this regard in FIG. 32, the clip 226 is shown of a predetermined width.

A clip is provided for each case with the width of each clip also being staggered in the manner taught in my previously issued U.S. patents referred to hereinbefore. Thus, the series of clips that are used each have a cut-out portion of a dimension slightly greater than the width of a tab in this series of shelves. In this way, the case with the clip attached is directed toward the front of the cabinet, inserted partially, and permitted to drop into place on the shelf until the extended portion of the clip rests on a particular tab. In this manner a single particular shelf is selected and the case is slipped onto that shelf.

In order to provide the selection at the front of the cabinet, each of the shelves 218 is provided with a notch 236. The notch is at the left side of the shelf as viewed in FIG. 30.

Figure 32:
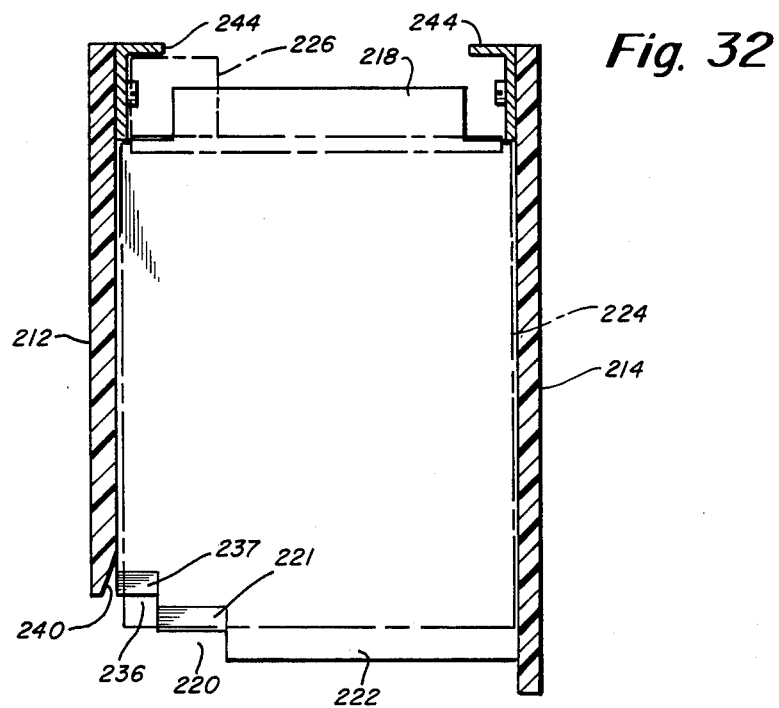
FIG. 32 is a cross-sectional view taken along line 32—32 of FIG. 30 showing one position for rear stop means when the storage case has a selection clip associated therewith.

In addition to the notch 236, it is also noted that the side wall 212 is cut away as illustrated in FIG. 32 so as to also expose the side of the notch 236. Moreover, there is provided at 240 a taper, which is instrumental for making it easier for insertion of the case. By terminating the front edge of the wall 212 at the position of the inside of the notch 236, there is provided much improved access to the edge of the case 224.

In connection with the notch 236 and the cut-out 220, it is noted that they both have angled surfaces or angled lips at 221 and 237, respectively. These angled lips aid in insertion of the disk storage case.

In the embodiment of the invention illustrated in FIG. 31, it is noted that the case 224 with the clip 226 attached thereto abuts on the back end of the cabinet at the angle bracket 244. Actually, as illustrated in FIG. 32, there are a pair of angle brackets on either side of the cabinet, one associated with each of the side walls 212 and 214. When the clip is used with the case as illustrated in FIG. 32, the angle brackets 244 are disposed so that the orthogonally disposed leg is at the very rear of the cabinet. In this way, sufficient room is left for the storage case with the clip attached thereto as illustrated in FIG. 32.

Figure 33:
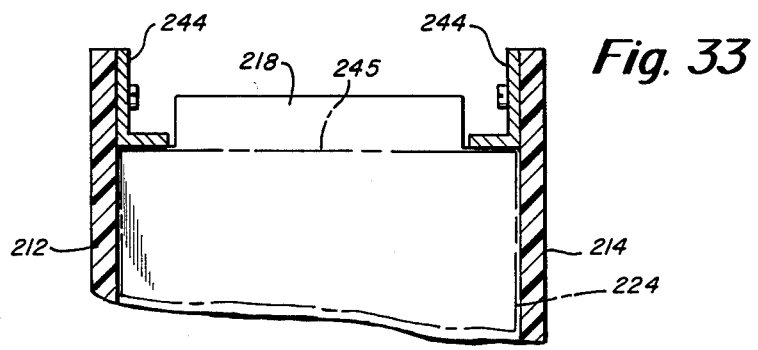
FIG. 33 is a fragmentary cross-sectional view similar to the view of FIG. 32 with the stop means in a different position assuming that the media storage case does not have a selection clip associated therewith.

In the case wheein there is no clip used with the storage case, then the brackets 244 are disposed in the position illustrated in FIG. 33. In that instance, the rear of the case is at the line 245 abutting against the end of the angle bracket 244. It is noted that in this position the angle bracket has its orthogonally disposed leg spaced inwardly of the very rear of the cabinet.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A storage case for the disk-type media comprising a base and cover and hinge means intercoupling the base and cover to permit the storage case to fold between closed and open position, in combination with a pick-up means adapted for insertion in the hole in the disk for picking the disk up, said pick-up means comprising a hand held fork member having opposite resilient legs adapted to fit within the hole in the disk.

2. A storage case as defined in claim 1 wherein said fork member is constructed of a spring-like material which is normally in a spread position but which may be deflected inwardly for insertion into the hole in the disk.

3. A storage case as defined in claim 1 wherein each leg of the pick-up device has a flanged end.

4. A storage case as defined in claim 1 wherein each leg of the pick-up device has an outwardly extending rib disposed a predetermined distance above the bottom of the leg.

5. A storage case as defined in claim 1 wherein one of the legs has a flanged end and the other leg has a rib disposed above the bottom thereof.

6. A storage case as defined in claim 1 in further combination with insert means adapted for positioning within the storage case and upon which the storage disk rests, said insert storage means comprising a substantially flat base and disk support means disposed in upstanding position from said base and between which the disk is supported, said disk support means circumscribing a circular locus corresponding substantially to the outer circular xdiameter of the disk.

7. A storage case as defined in claim 1 including means on the case cover for enabling lifting thereof.

8. A storage case for a disk-type media comprising a base and cover and hinge means intercoupling the base and cover to permit the storage case to fold between closed and open positions, said cover having a rear wall, said base having a bottom wall terminating short of the rear of the base to provide a rear base opening defined in part by the base bottom wall rear edge, in combination with a removable clip for maintaining the cover in a substantially upright position in the open position of the case, said clip including a pair of said walls defining a recess into which the cover rear wall engages to hold the clip on the case, and means for engaging the base bottom wall rear edge only in the open position of the case and to so limit the open position to a substantially upright one.

9. A storage case as set forth in claim 8 in further combination with insert means adapted for positioning with the storage case and upon which the storage disk rests, said insert means comprising a substantially flat base and disk support means disposed in an upstanding position from said base and between which the disk is supported, said disk support means circumscribing a circular locus corresponding substantially to the outer circular diameter of the disk.

10. A storage case as set forth in claim 8 wherein said clip has a beveled wall.

11. A storage case as defined in claim 8 including means on the case cover for enabling lifting thereof.

12. A storage case as set forth in claim 8 wherein said clip also has a top wall to engage the top of the cover.

13. A storage case for a disk-type media comprising a base and cover, in combination with insert means adapted for positioning within the storage case and upon which the storage disk rests, said insert means comprising a substantially flat base and disk support means disposed in an upstanding position from said base and between which the disk is supported, said disk support means circumscribing a circular locus corresponding substantially to the outer circular diameter of the disk, said support means being tapered having top and bottom ends with the top end circumscribing a first locus of diameter greater than the disk diameter to permit the disk to pass thereby, said bottom end circumscribing a second locus of diameter less than the disk diameter to enable the disk to be supported on the support means resting at its periphery between top and bottom ends, in combination with a pick-up means adapted for insertion in the hole in the disk for picking the disk up, said pick-up means comprising a hand held fork member having opposite resilient legs adapted to fit within the hole in the disk.

14. A storage case as defined in claim 13 wherein the base has a hole therethrough.

15. A storage case for a disk-type media comprising a base and cover, in combination with insert means adapted for positioning within the storage case and upon which the storage disk rests, said insert means comprising a substantially flat base and disk support means disposed in an upstanding position from said base and between which the disk is supported, said disk support means circumscribing a circular locus corresponding substantially to the outer circular diameter of the disk, said storage case base having opposite walls, a rear wall and means at the rear wall including a beveled surface against which the storage case cover rests, said beveled surface defining a limiting means for the open position of the cover said cover further having a front substantially vertically disposed wall in the closed position of the storage case, and hinge means intercoupling the base and cover to permit the storage case to fold between closed and open positions, in combination with pick-up means adapted for insertion in the hole in the disk for picking the disk up, said pick-up means comprising a hand held fork member having opposite resilient legs adapted to fit within the hole in the disk.

16. A storage case as set forth in claim 15 including means on the case cover for enabling lifting thereof.

* * * * *